US010934003B2

(12) United States Patent
Bowker et al.

(10) Patent No.: US 10,934,003 B2
(45) Date of Patent: Mar. 2, 2021

(54) CONNECTOR FOR AN AIRCRAFT SEAT

(71) Applicant: ACRO AIRCRAFT SEATING LIMITED, Crawley (GB)

(72) Inventors: James Bowker, Crawley (GB); Andrew Lawler, West Sussex (GB)

(73) Assignee: Acro Aircraft Seating Limited, Crawley (GB)

(*) Notice: Subject to any disclaimer, the term of this patent is extended or adjusted under 35 U.S.C. 154(b) by 424 days.

(21) Appl. No.: 15/744,617

(22) PCT Filed: Jul. 12, 2016

(86) PCT No.: PCT/GB2016/052105
§ 371 (c)(1),
(2) Date: Jan. 12, 2018

(87) PCT Pub. No.: WO2017/009635
PCT Pub. Date: Jan. 19, 2017

(65) Prior Publication Data
US 2018/0201376 A1 Jul. 19, 2018

(30) Foreign Application Priority Data

Jul. 13, 2015 (GB) .................................. 1512186.6

(51) Int. Cl.
B64D 11/06 (2006.01)
(52) U.S. Cl.
CPC .............................. B64D 11/0696 (2013.01)
(58) Field of Classification Search
CPC ............... B64D 11/0696; B64D 9/003; B60N 2/01558; B60N 2/01516; B60N 2/07;
(Continued)

(56) References Cited

U.S. PATENT DOCUMENTS

2011/0068226 A1* 3/2011 Baatz ................. B64D 11/0696
244/118.6
2016/0061248 A1* 3/2016 Stewart ................. F16B 31/028
411/360

FOREIGN PATENT DOCUMENTS

DE 3447178 A1 7/1986
DE 10 2007 054513 A1 5/2009
(Continued)

OTHER PUBLICATIONS

International Search Report and Written Opinion for PCT/GB2016/052105 dated Oct. 4, 2016.

Primary Examiner — Claude J Brown
(74) Attorney, Agent, or Firm — Blank Rome LLP

(57) ABSTRACT

Described is a connector for securing an aircraft seat to the floor of an aircraft cabin. The connector comprises a head for securing the connector to an aircraft seat and a foot for being held within a securing means on the floor of an aircraft cabin, said head and foot being provided on a body, wherein the head comprises a first screw thread for engagement with a screw thread of an aircraft seat and a second screw thread in engagement with a screw thread on the body, the connector comprising a stop for restricting rotational movement of the body relative to an aircraft seat, wherein the screw threads are configured such that rotation of the head into engagement with a screw thread of an aircraft seat causes movement of the body into engagement with the head. Also described is a seat or row of seats for receiving the connector and seat or row of seats comprising one or more of the connectors.

16 Claims, 7 Drawing Sheets

(58) Field of Classification Search
CPC ....... B60N 2/0732; B64C 1/20; F16B 37/045;
F16B 31/028; F16B 37/00; F16B 5/0216;
F16B 5/0241; F16B 5/12; F16B 5/02
USPC ...................................................... 244/118.6
See application file for complete search history.

(56) References Cited

FOREIGN PATENT DOCUMENTS

GB            2540481 B     10/2017
WO    WO-2015/198278 A1    12/2015

\* cited by examiner

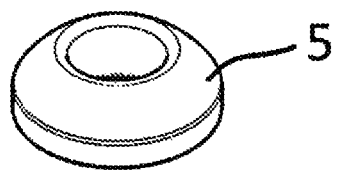
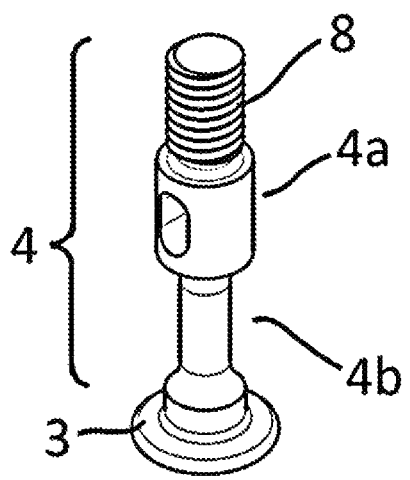
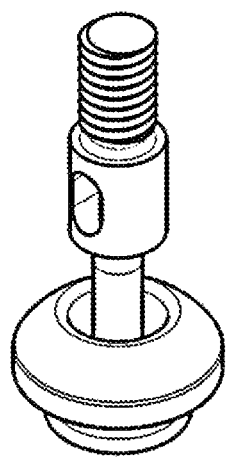
Fig 2A        Fig 2B
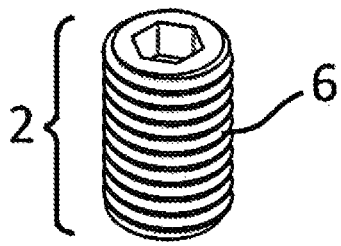
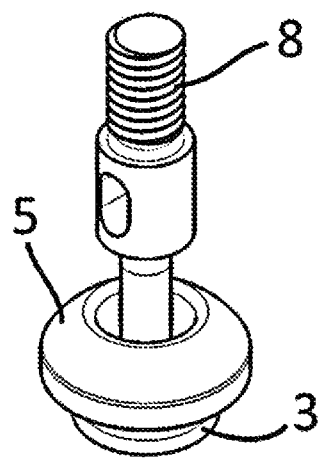
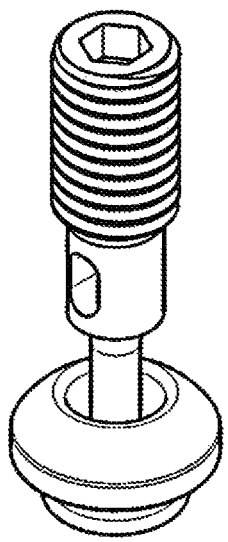
Fig 2C        Fig 2D

CONNECTOR FOR AN AIRCRAFT SEAT

This application is a national stage application of and claims the benefit of International Patent Application No. PCT/GB2016/052105, filed Jul. 12, 2016, which is based on and claims priority to Great Britain Patent Application No. 1512186.6, filed Jul. 13, 2015, both entitled "Connector for An Aircraft Seat," the contents and disclosures of which are incorporated herein by reference.

The present invention relates to connectors for securing aircraft seats to the floor of an aircraft cabin, in particular to connectors which provide a much improved ease of use and maintenance.

Typically, aircraft seats are secured to the floor of an aircraft cabin via foot studs, for example taking the form of nuts and bolts. In this respect, it is known for a nut to be partially installed onto a bolt such that there is a gap between the head of the bolt and the nut, for the resulting assembly to be installed to an aircraft seat such that the nut and bolt protrude, for the seat to be installed to a seat-track/channel on or in the cabin floor, with the channel passing through the gap between the head of the bolt and the nut, and for the nut to be tightened to secure the channel to the bolt and hence seat-track/channel.

There are, however, several disadvantages associated with this; for example, not least, the time taken to tighten the nut onto the seat-track/channel and the tooling restrictions for carrying this out. It is also difficult to ensure that all nuts are tightened to the same degree and meet strict safety standards.

It is, therefore, an object of the present invention to seek to alleviate the above identified problems.

SUMMARY OF THE INVENTION

According to one aspect of the present invention, there is provided a connector for securing an aircraft seat to the floor of an aircraft cabin, the connector comprising a head for securing the connector to an aircraft seat and a foot for being held within a securing means on the floor of an aircraft cabin, said head and foot being provided on a body, wherein the head comprises a first screw thread for engagement with a screw thread of an aircraft seat, a second screw thread in engagement with a screw thread on the body, and a stop for restricting rotational movement of the body relative to an aircraft seat, wherein the screw threads are configured such that rotation of the head into engagement with a screw thread of an aircraft seat causes movement of the body into engagement with the head.

Remarkably, as result of the configuration of screw threads on the body and head of the connector, when rotation of the body is constrained relative to an aircraft seat, rotation of the head into engagement with a screw thread of an aircraft seat results in movement of the foot relative to the aircraft seat at a rate which is greater than the corresponding longitudinal movement of the head relative to the aircraft seat. This means that a small degree of rotation of the head causes a larger distance of movement of the foot than would otherwise occur. This, in turn, means that the aircraft seat can be tightened against a securing means on the floor of an aircraft cabin with only minimal rotation of the head.

For example, as described in the detailed embodiments below, whilst a ¾ turn, i.e. a 270 degree of rotation, of the head causes the head to move around 2.1 mm, this equates to a movement of around 3.3 mm of the foot towards the aircraft seat.

Preferably, the foot and body are integrally formed. For example, it will be appreciated that in particular embodiments, the foot and body form a bolt for screw-thread connection to the head, with the head taking the form of a nut.

Preferably, in use, for example during installation of an aircraft seat, movement of the foot relative to the aircraft seat causes the aircraft seat to tighten into engagement with a securing means on the floor of an aircraft cabin.

Preferably, the head comprises a collar for positioning around the body.

Preferably, the head is substantially cylindrical.

Preferably, the first screw thread is provided on the outside surface of the head and the second screw thread is provided on the inside surface of the head.

Preferably, the screw thread on the body is provided on an outside surface of the body.

Preferably, the first screw thread of the head is provided in a first direction and the screw thread on the body is provided in a second direction. Put another way, it is preferred that the first screw thread of the head is provided in a different orientation to the screw thread on the body.

Preferably, the first screw thread of the head is a left hand screw thread and the screw thread on the body is a right hand screw thread. Alternatively, the first screw thread of the head is a right hand screw thread and the screw thread on the body is a left hand screw thread.

Preferably, the first screw thread of the head comprises threads of a different density than the screw thread on the body. Put another way, the first screw thread of the head preferably comprises a density of threads different to that of the screw thread on the body.

Preferably, the first screw thread of the head comprises a lower density of threads than the screw thread on the body. Alternatively, the first screw thread of the head comprises a higher density of threads than the screw thread on the body.

Preferably, the first screw thread of the head comprises fewer threads per inch than the screw thread on the body. Alternatively, the first screw thread of the head comprises more threads per inch than the screw thread on the body.

Preferably, in embodiments wherein the first screw thread of the head comprises a lower density of threads than the screw thread on the body, the first screw thread of the head comprises between about 8 and about 15 threads per inch, preferably between about 9 and about 13 threads per inch, preferably between about 10 and about 12 threads per inch, most preferably about 11 threads per inch.

Preferably, in embodiments wherein the first screw thread of the head comprises a lower density of threads than the screw thread on the body, the screw thread of the body comprises between about 12 and about 20 threads per inch, preferably between about 14 and about 18 threads per inch, preferably between about 15 and about 17 threads per inch, most preferably about 16 threads per inch.

Preferably, in embodiments wherein the first screw thread of the head comprises a higher density of threads than the screw thread on the body, the screw thread of the body comprises between about 8 and about 15 threads per inch, preferably between about 9 and about 13 threads per inch, preferably between about 10 and about 12 threads per inch, most preferably about 11 threads per inch.

Preferably, in embodiments wherein the first screw thread of the head comprises a higher density of threads than the screw thread on the body, the first screw thread of the head comprises between about 12 and about 20 threads per inch, preferably between about 14 and about 18 threads per inch, preferably between about 15 and about 17 threads per inch, most preferably about 16 threads per inch.

With regard to "threads per inch" or "TPI", it will be appreciated that 10 threads per inch corresponds to a thread pitch of 2.54 mm, or a distance of 2.54 mm between threads. In this respect, the conversion from TPI to pitch is 25.4 divided by TPI.

With reference to the term "density of threads", it will be appreciated that this refers to the number of threads per inch. A higher density of threads will have more threads per inch than a lower density of threads.

Preferably, in embodiments wherein the first screw thread of the head comprises a lower density of threads than the screw thread on the body, the first screw thread of the head comprises a thread pitch of between about 1.7 mm and about 3.2 mm, preferably between about 2.0 mm and about 2.8 mm, preferably between about 2.1 mm and about 2.5 mm, most preferably about 2.3 mm.

Preferably, in embodiments wherein the first screw thread of the head comprises a lower density of threads than the screw thread on the body, the screw thread of the body comprises a thread pitch of between about 1.3 mm and about 2.1 mm, preferably between about 1.4 mm and about 1.8 mm, preferably between about 1.5 mm and about 1.7 mm, most preferably about 1.6 mm.

Preferably, in embodiments wherein the first screw thread of the head comprises a higher density of threads than the screw thread on the body, the screw thread of the body comprises a thread pitch of between about 1.7 mm and about 3.2 mm, preferably between about 2.0 mm and about 2.8 mm, preferably between about 2.1 mm and about 2.5 mm, most preferably about 2.3 mm.

Preferably, in embodiments wherein the first screw thread of the head comprises a higher density of threads than the screw thread on the body, the first screw thread of the head comprises a thread pitch of between about 1.3 mm and about 2.1 mm, preferably between about 1.4 mm and about 1.8 mm, preferably between about 1.5 mm and about 1.7 mm, most preferably about 1.6 mm.

Preferably, the head is configured for engaging a tool for turning the head in a clockwise or anticlockwise direction.

Preferably, the head comprises a socket for receiving a tool for turning the head in a clockwise or anticlockwise direction.

Preferably, the head comprises a socket for receiving a hex key.

Preferably, the foot is substantially circular.

Preferably, the body comprises the stop.

Preferably, the stop is configured for restricting rotational movement of the body about its longitudinal axis and for allowing movement of the body along its longitudinal axis.

Preferably, the stop comprises a slot.

Preferably, the slot extends through the body.

Preferably, the stop comprises an elongate slot.

Preferably, the stop is for engaging a second stop on the leg of an aircraft seat.

Preferably, the stop is for receiving a second stop on the leg of an aircraft seat.

Preferably, the stop is for receiving a pin inserted through the leg of an aircraft seat.

Most preferably, the stop comprises an elongate slot for receiving a pin inserted through one side of a leg of an aircraft seat, through the body and through the other side of the leg of the aircraft seat.

Preferably, the body comprises an elongate shaft.

Preferably, the body is substantially cylindrical.

Preferably, the body comprises a portion of increased diameter for accommodating the stop.

Preferably, the portion of increased diameter is positioned adjacent the screw thread of the body.

This means that the portion of the body between the foot and the portion of increased diameter, i.e. the portion of the body with a narrow diameter, is positioned in the part of the connector furthest from the point at which the connector is attached to a seat, i.e. away from the head of the connector. This is advantageous because it means that the part of the connector most likely to bend during an emergency, i.e. the portion with a narrow diameter, is positioned away from the point at which the connector is attached to the seat, i.e. away from the head. This means that the integrity of the connection to an aircraft seat can be maintained during bending of the connector, i.e. during bending of the portion with a narrow diameter.

Preferably, the screw thread of the body is provided at one end of the body.

Preferably, the connector comprises a washer between the foot and the head.

Preferably, the washer is positioned around the body.

Preferably, the washer allows rotation of the aircraft seat relative to a securing means on the floor of an aircraft cabin about the fore-aft axis.

Preferably, the washer is domed.

Preferably, the washer is hemi-spherical.

Preferably, the head facing surface of the washer is domed.

Preferably, the head facing surface of the washer is hemi-spherical.

Preferably, the washer is shaped such that, when the connector is inserted into a securing means on the floor of an aircraft cabin, the centre point of the dome/hemi-sphere is aligned with the top centre line of the securing means.

Preferably, the washer is non-deformable.

Preferably, the washer is a metal washer, most preferably a steel washer.

Preferably, in use, for example during installation of an aircraft seat, movement of the foot relative to the aircraft seat causes the aircraft seat to tighten into engagement with a securing means on the floor of an aircraft cabin with the washer sandwiched between the aircraft seat and the securing means.

The use of a metal, non-deformable, washer is particularly advantageous because it avoids any issues resulting from time dependent deformation (creep).

Preferably, the securing means comprises a channel formed in or on the floor of an aircraft cabin.

Preferably, the securing means comprises a track provided in or on the floor of an aircraft cabin.

Preferably, the track comprises a channel.

Preferably, the channel is for receiving the foot.

According to an aspect of the present invention, there is provided a connector for securing an aircraft seat to the floor of an aircraft cabin, the connector comprising a head for securing the connector to an aircraft seat and a foot for being held within a securing means on the floor of an aircraft cabin, said head and foot being provided on a body, wherein the head comprises a first screw thread for engagement with a screw thread of an aircraft seat and a second screw thread for engagement with a screw thread on the body, wherein the screw threads are configured such that, in use, for example during installation of an aircraft seat, when the first screw thread is in engagement with a screw thread of an aircraft seat, when the second screw thread is in engagement with the screw thread on the body, and when rotation of the body is restricted or prevented, rotation of the head into engagement with the aircraft seat causes movement of the body into engagement with the head, said movement of the body into engagement with the head causing the foot to move towards the aircraft seat, said movement of the foot towards the aircraft seat causing the aircraft seat to tighten into engagement with the securing means on the floor of an aircraft cabin.

Preferably, the body comprises a stop for restricting or preventing rotation of the body.

According to an aspect of the present invention, there is provided a connector for securing an aircraft seat to the floor of an aircraft cabin, the connector comprising a head for securing the connector to an aircraft seat and a foot for being held within a securing means on the floor of an aircraft cabin, said head and foot being provided on a body, wherein the head comprises a first screw thread for engagement with a screw thread of an aircraft seat and a second screw thread in engagement with a screw thread on the body, the connector comprising a stop for restricting rotational movement of the body relative to an aircraft seat, wherein the screw threads are configured such that rotation of the head into engagement with a screw thread of an aircraft seat causes movement of the body into engagement with the head.

According to a further aspect of the present invention, there is provided a seat or row of seats for receiving a connector as described herein.

Preferably, the seat or row of seats comprises an aircraft seat or seats.

Preferably, the seat or row of seats comprises one or more screw threads for engagement with a connector as described herein.

Preferably, the one or more screws threads are provided in one or more legs of the seat or row of seats.

Preferably, the one or more screw threads are positioned such that, when a connector as described herein is received therein, the foot of the connector projects beyond a floor-facing surface of the or a leg of the seat or row of seats.

Preferably, one or more legs of the seat or row of seats comprises a chamfered floor-facing surface.

Preferably, the inner floor-facing edge of one or more legs of the seat or row of seats is chamfered.

Preferably, the outer floor-facing edge of one or more legs of the seat or row of seats is chamfered.

Preferably, both outer floor-facing edges of one or more legs of the seat or row of seats is chamfered.

Preferably, one or more of the legs of the seat or row of seats comprise one or more apertures for accessing a head of a connector as described herein when said connector is received in the one or more legs.

Preferably, one or more legs of the seat or row of seats are shaped such that when a connector is received within the one or more legs, the connector is set back, i.e. offset, from the front of the seat.

Put another way, it is preferred that the position at which each connector is secured to the seat is set back from the front edge of the seat.

Preferably, at least part of the front edge of one or more legs of the seat or row of seats is curved inwards towards the rear of each leg.

Preferably, a connector as described herein forms a front foot of one or more legs of the seat or row of seats.

Preferably, the seat or row of seats comprises one or more connectors as described herein.

As such, in one aspect of the present invention, there is provided a seat or row of seats comprising one or more connectors as described herein.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein and vice versa.

DETAILED DESCRIPTION

Example embodiments of the present invention will now be described with reference to the accompanying figures, in which FIG. 1 shows a connector according to the present invention;

FIGS. 2A to 2D show assembly of the connector shown in FIG. 1;

The present invention relates to connectors for securing aircraft seats to the floor of an aircraft cabin.

Figure 7:
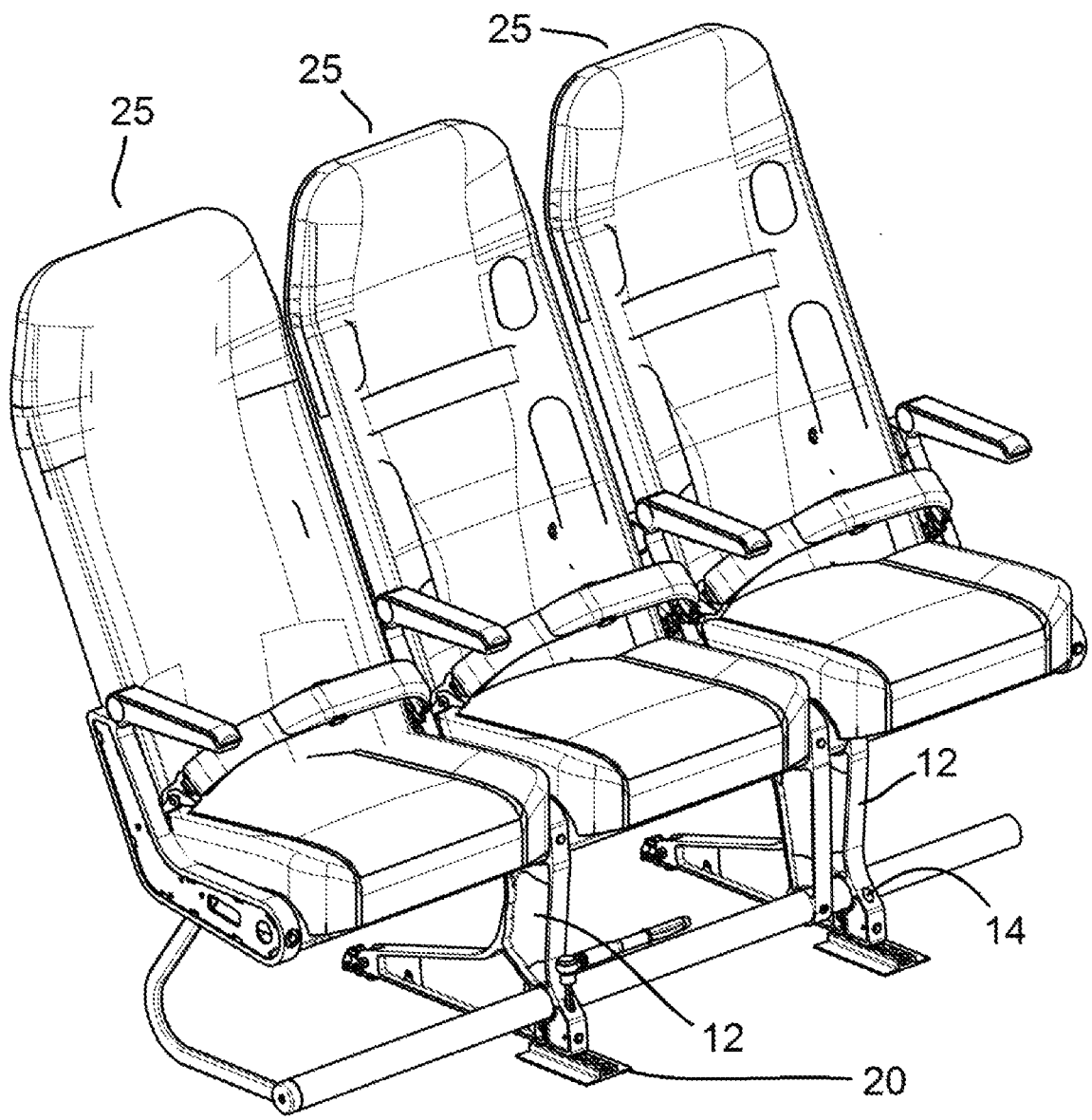
FIG. 7 shows a perspective view of the row of aircraft seats shown in FIG. 6.

Within this specification, reference to an aircraft seat also includes reference to a row of aircraft seats, for example as shown in FIG. 7.

Within this specification, the term "about" means plus or minus 20%, more preferably plus or minus 10%, even more preferably plus or minus 5%, most preferably plus or minus 2%.

Within this specification, reference to "one or more" preferably includes "all".

Figure 1:
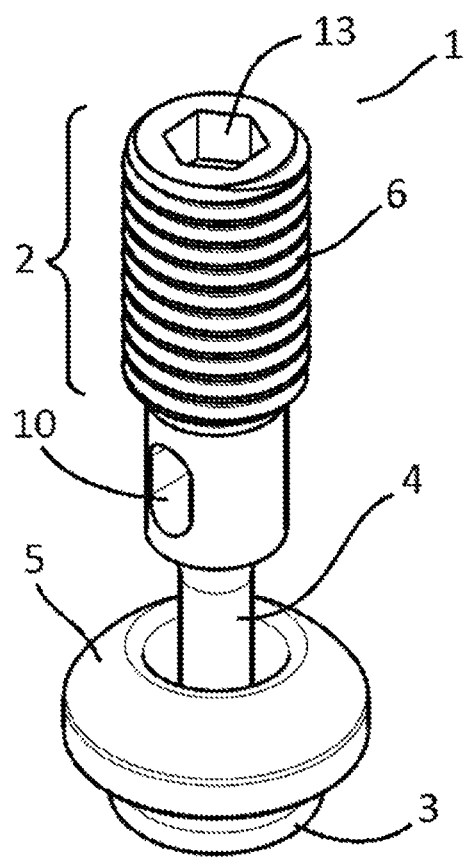
Figure 5A:
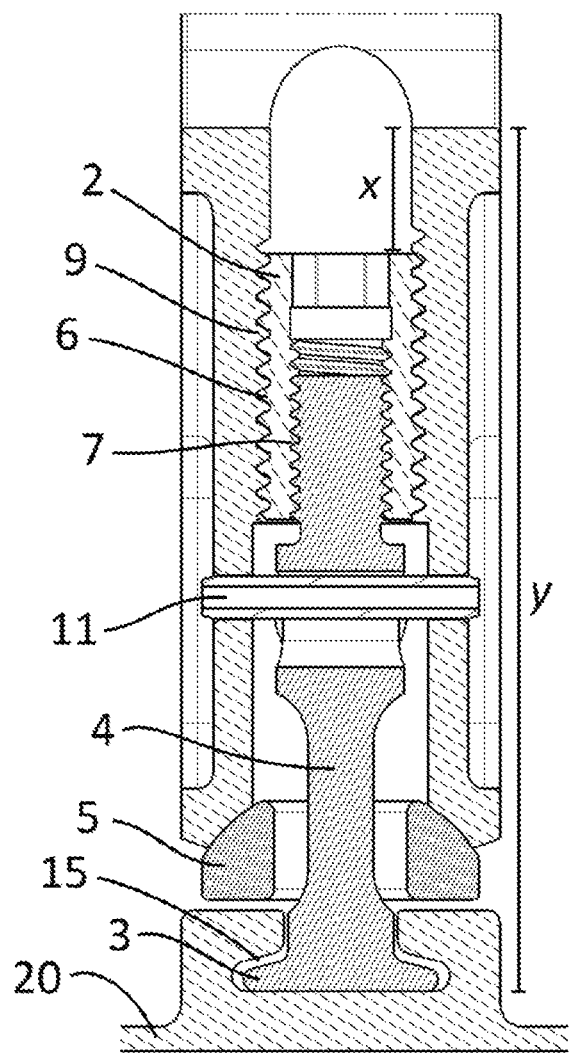
FIGS. 5A and 5B show a cross-sectional view of the connector shown in FIG. 1 attached to an aircraft seat in a loose position (FIG. 5A) and a clamped position (FIG. 5B)
Figure 5B:
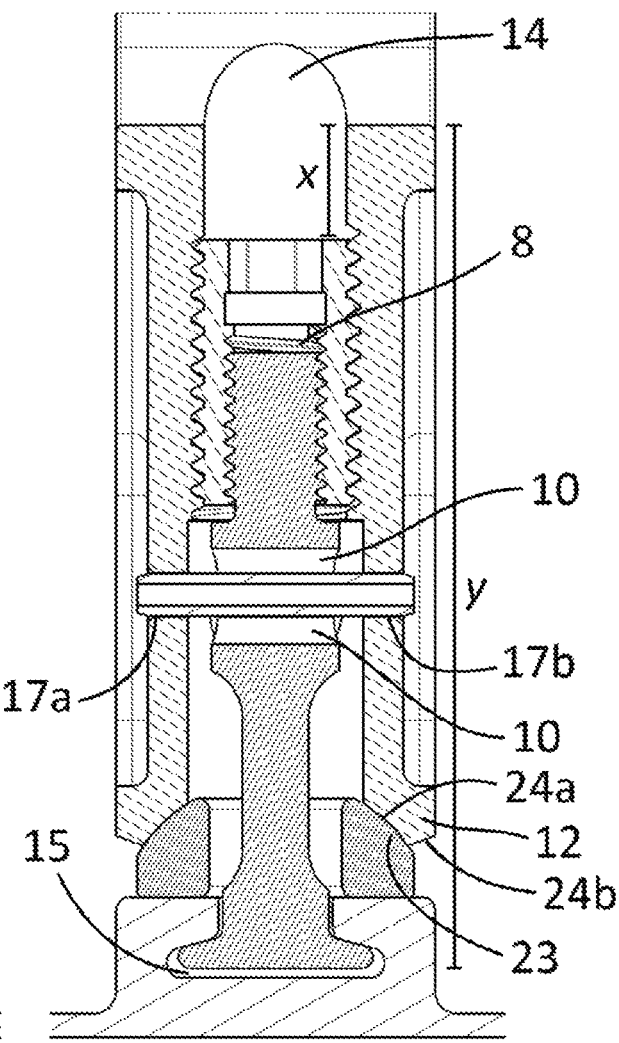

With reference to FIG. 1, a connector 1 comprises a head 2, foot 3 and body 4. The head 2 is in the form of a collar screwed onto one end of the body 4. At the other end of the body 4 is provided the foot 3. In the embodiment shown, the connector 1 also includes a steel hemi-spherical washer 5 positioned around the body 4 between the head 2 and the foot 3. The head 2 comprises a first (outer) screw thread 6 for engagement with a screw thread on an aircraft seat and a second (inner) screw thread 7 (as shown in FIGS. 5A and 5B) for engagement with a screw thread 8 on the body 4.

Whilst the Figures are not to scale, in the particular embodiment shown, the length of the connector 1 from the base of the foot 3 to the top of the body 4 is 58 mm, distance from the top of the head 2 to the base of the foot 3 when then head is fully screwed to the end of the body 4 is 67 mm the length of the head 2 is 25 mm.

With reference to FIG. 2C, the outer screw thread 6 of the head 2 is provided in a different orientation to the screw thread 8 of the body 4. In the example shown, the outer screw thread 6 of the head 2 is an anti-clockwise, or left-hand, screw thread whilst the screw thread 8 on the body is a clockwise, or right-hand, screw thread. This means that, if the body 4 is prevented from rotating, rotation of the head 2 into a screw thread 9 (see FIG. 3A) provided in an aircraft seat causes the body 4 to move into the head 2. The foot 3 is connected to the body 4, such that when the head 2 is screwed into an aircraft seat, the foot 3 also moves towards the head 2 and the aircraft seat. This is described in greater detail below with reference to FIGS. 5A and 5B.

The outer screw thread 6 of the head 2 is a ⅝-11 UNC-2B LH thread whilst the screw thread 8 of the body is a ⅜-16 UNC-2B RH thread.

A stop 10, in the form of a slot, is provided on the body 4. The slot 10 is shaped for receiving a locking pin 11 (see FIGS. 3C, 3D, 5A and 5B). In the embodiment shown, the locking pin 11 is a coiled spring pin; however, it will be appreciated that a simple dowel could also be used. With the locking pin 11 in place, rotation of the body 4 is restricted. Whilst rotation of the body 4 about its longitudinal axis is restricted, the elongate shape of the slot 10 permits longitudinal movement of the body 4 along its longitudinal axis. This, therefore, allows the body 4 to move into the head 2, as described above, when the head 2 is screwed into an aircraft seat.

A hex socket 13 is provided in the head 2 for insertion of a hex key 19 to enable the head 2 to be turned, i.e. rotated about its longitudinal axis, when in engagement with a screw thread 9 of an aircraft seat (see below, with reference to FIGS. 3A to 3D).

As shown in FIGS. 2A to 2D, the connector 1 is assembled by placing the washer 5 over the body 2 and then screwing the head 2 onto the body 4 via the screw thread 8 which engages with the screw thread 7 provided on the inside surface of the head 2. The connector 1 is then ready for connection to an aircraft seat.

Figure 3A:
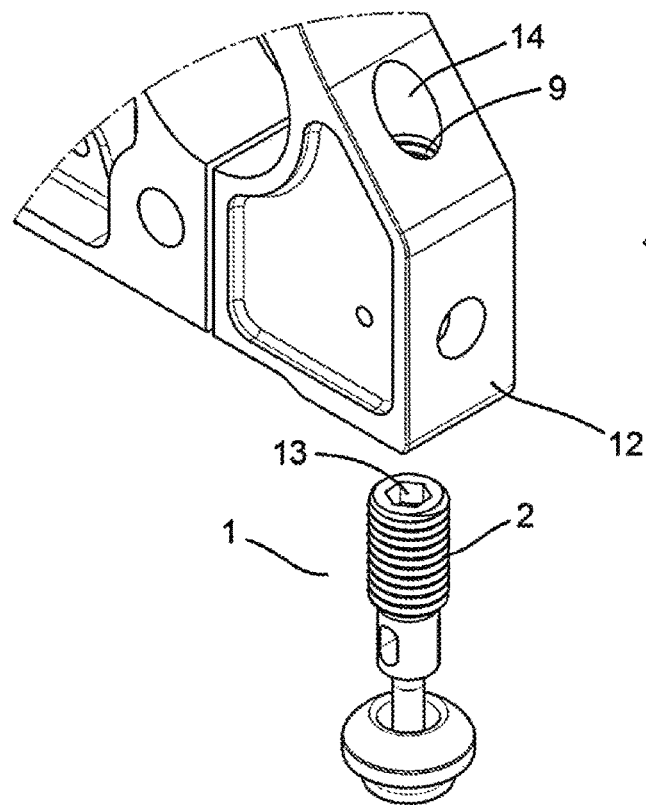
FIGS. 3A to 3D show attachment of the connector shown in FIG. 1 to the leg of an aircraft seat.
Figure 3B:
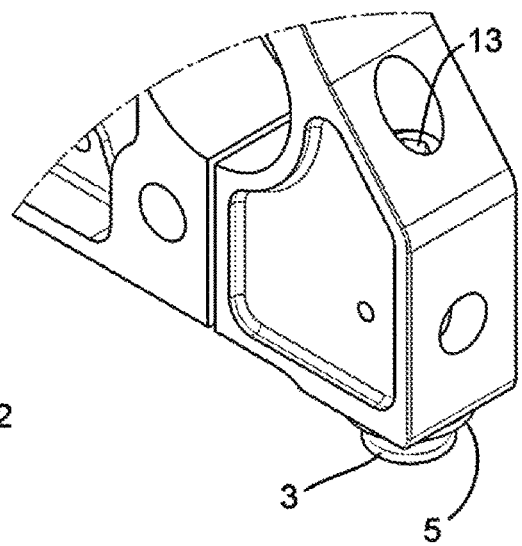

With reference to FIGS. 3A and 3B, the connector 1 is positioned below the leg 12 of an aircraft seat and then introduced into the interior of the leg 12 and into a screw thread 9. The hex socket 13 of the head 2 is visible, and can be accessed, through an aperture 14 in the leg 12. The head 2 is initially screwed into the screw thread 9 of the seat by hand. As will be seen from FIG. 3B, once the head has been screwed into the seat, the foot 3 is positioned below the leg of the seat 12. The distance between the foot 3 and the underside of the leg 12 can be adjusted by unscrewing or screwing the head 2 until a desired gap is produced; i.e. by rotating the head 2 in the desired direction of rotation.

Figure 4B:
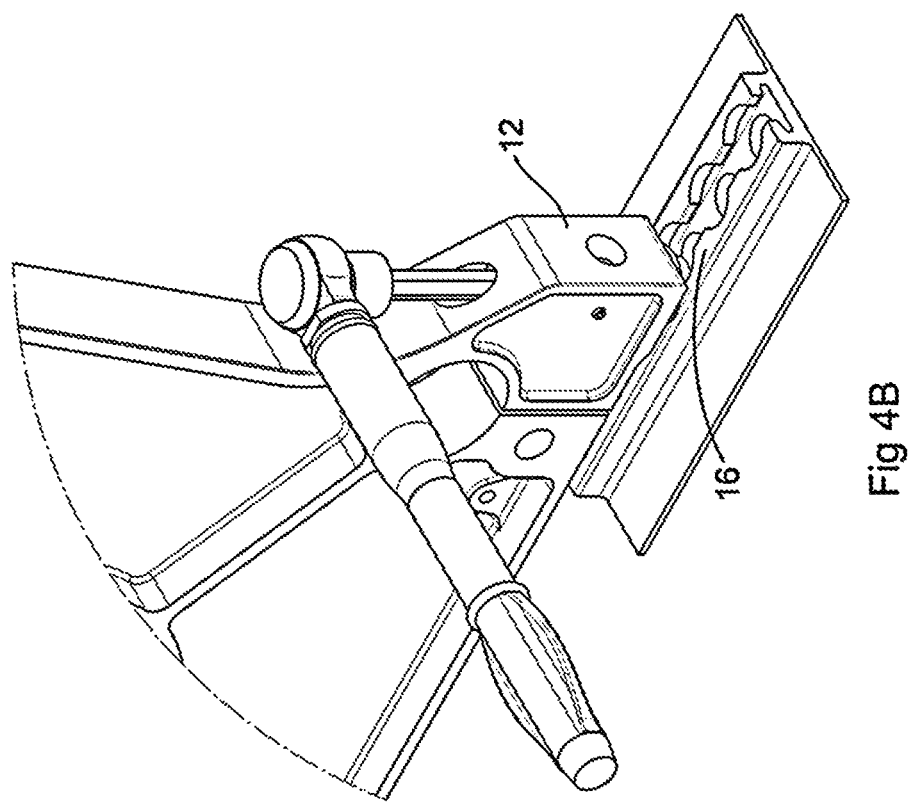
FIGS. 4A and 4B show tightening of the connector shown in FIG. 1 from a loose position (FIG. 4A) to a clamped position (FIG. 4B)

As discussed in further detail below, with reference to FIGS. 4A and 4B, once the connector 1 is secured to the seat, the foot 3 is placed into a channel 15 provided on the floor of an aircraft cabin. Accordingly, the gap between the foot 3 and the underside of the leg 12 should be sufficient to allow insertion of the foot 3 into the channel 15. Once inserted into the channel 15, the head 2 can be turned to move the foot 3 towards the underside of the leg 12 causing the leg 12 to move toward the outer surface 16 of the channel 15 and into a clamped position with the washer 5 clamped therebetween.

Figure 3C:
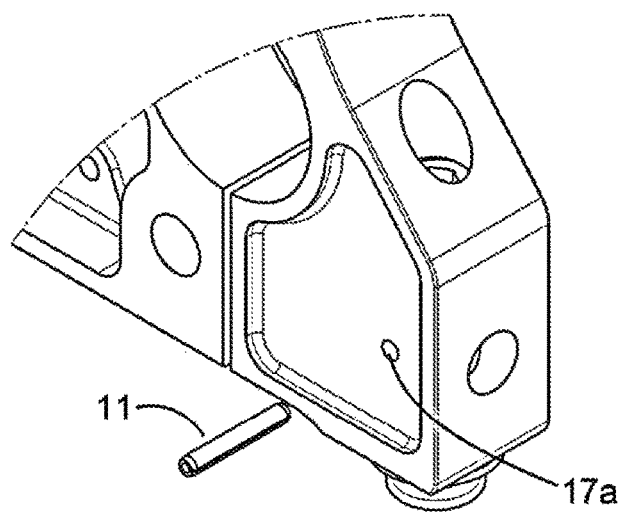
Figure 3D:
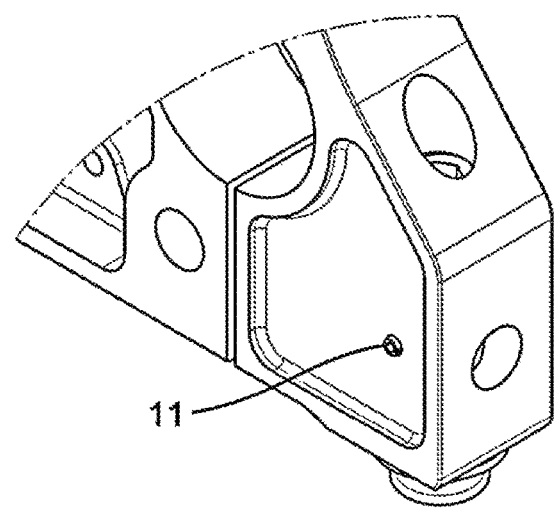

With reference to FIGS. 3C and 3D, once the connector 1 has been connected to the seat and the desired gap between the foot 3 and the underside of the aircraft seat leg 12 has been achieved, a locking pin 11 is inserted through a hole 17a in the side of the aircraft seat leg 12, through the slot 10 of the body 4 and through a corresponding hole 17b in the other side of the leg 12 (see FIGS. 5A and 5B). This restricts further rotation of the body 4 and thus maintains the gap between the foot 3 and the underside of the aircraft seat leg 12 until the head 2 is turned via the hex socket 13.

Figure 4A:
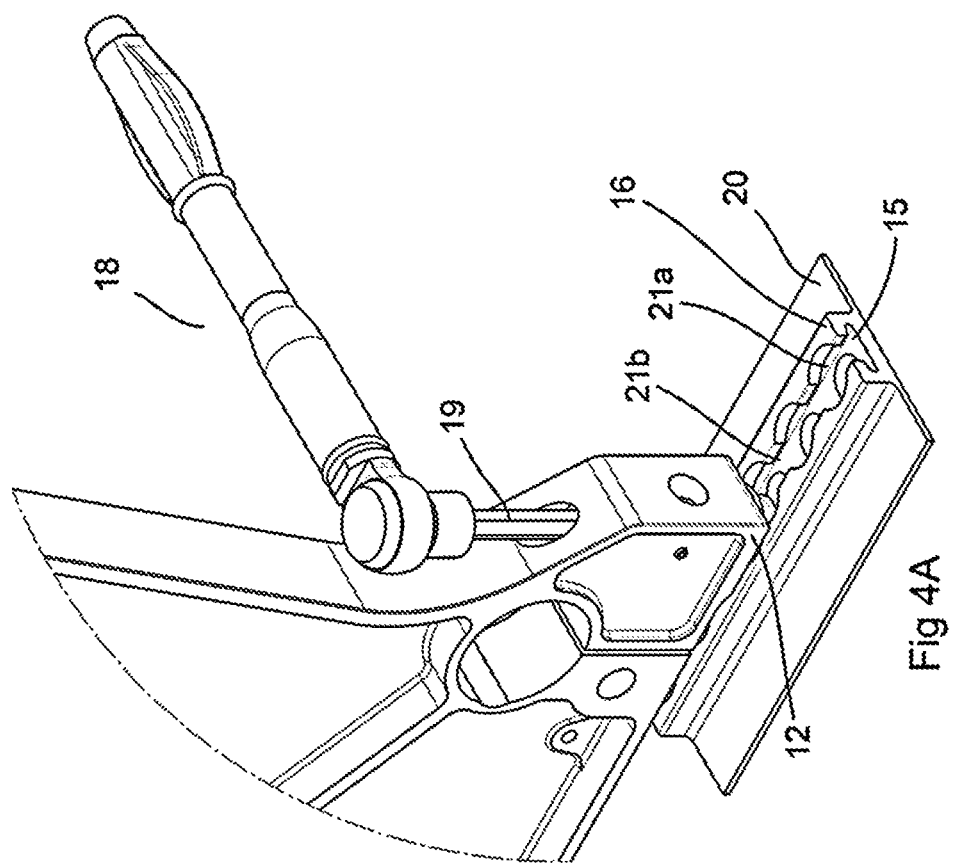

As shown in FIG. 4A, once the connector 1 has been connected to the aircraft seat, the foot 3 is inserted into a channel 15 provided in a track (securing means) 20 provided on or in the floor (not shown) of an aircraft cabin. The track 20 includes a series of circular apertures 21a separated by narrowed openings 21b. The foot 3 can be inserted through a circular opening 21a and then slid along the channel 15 to a position corresponding to a narrowed opening 21b at which the foot 3 is prevented from exiting the channel 15.

Once the foot 3 has been positioned below a narrowed opening 21b, the head 2 can be turned, for example by a torque wrench 18 with a hex key 19, from a loose position (FIGS. 4A and 5A) to a clamped position (FIGS. 4B and 5B) causing the foot 3 to move towards the underside of the leg 12 of the seat and clamp the underside of the leg 12 to the outer surface 16 of the track 20 with the washer 5 sandwiched therebetween.

Movement of the foot 3, body 4 and head 2 is shown in further detail with reference to FIGS. 5A and 5B. As will be seen, in a loose position (FIG. 5A), the washer 5 is in abutment with the underside of the leg of the seat 12 and there is a 1 mm gap between the upper face of the track 20 and the underside of the washer 5. As the head 2 is tightened to the position shown in FIG. 5B, the upper surface of the foot 3 moves into engagement with the inside surface of the channel 15, and the underside of the leg 12 lowers such that the washer 5 is in abutment with both the underside of the leg 12 and the top of the track 20. As a result, the leg 12 is now clamped against the track 20 with the washer 5 sandwiched therebetween.

With regard to the relative movement of the head 2 and foot 3, it will be seen that the distance moved by the foot 3 relative to the leg 12 is greater than the distance moved by the head 2 relative to the leg 12. For example, whilst FIGS. 5A and 5B are not to scale, in FIG. 5A, the distance x between the top of the head 2 and the top of the leg 12 is about 11.9 mm and in FIG. 5B this distance is about 10.8 mm. Accordingly, the distance travelled by the head from a loose to a clamped position is about 1.1 mm. In contrast, the distance y between the base of the foot 3 and the top of the leg 12 is about 81.3 mm and in FIG. 5B this distance is about 79.4 mm. Accordingly, the distance travelled by the foot from a loose to a clamped position is about 1.9 mm.

As described above, this means that by just a ½ turn of the head 2, the distance travelled by the foot 3 is 1.9 mm. This means that, with only a ½ turn or ¾ turn of the head, i.e. a 180-degree or 270-degree rotation, there is sufficient movement of the head to allow for an appropriate gap to be provided between the foot 3 and the underside of the leg 12 such that the foot 3 can be inserted into the channel 15, but at the same time cause sufficient tightening of the leg 12 against the track 20. An installer can be provided with a torque setting to use which can be achieved over a smaller rotation than would otherwise be possible.

As noted herein, the washer 5 is provided with spherical surface 23 on its leg (head) facing surface. This is advantageous because it allows the leg 12 to move relative to the washer 5 during movement of the floor relative to the seat and thus not compromise secure attachment of the seat to the floor in an emergency such as a crash or emergency landing. This is further aided by spherical surface 24a and chamfered surface 24b on the underside of the leg 12. Spherical surface 24a is provided on the inside of the leg 12 and chamfered surface 24b is provided on the outside of the leg. In particular, spherical surface 24a permits movement relative to the washer 5 and chamfered surface 24b permits movement relative to the track 20.

To further allow for movement of the seat relative to the floor, the body 4 is provided in the form of a shaft. The width of the shaft 4 is kept to a minimum to provide an appropriate balance between strength and the ability to bend. In order to permit the provision of the locking pin receiving slot 10, the diameter of the shaft 4 is increased around the slot 10. This allows the shaft 4 to maintain its required strength but to still permit appropriate bending to withstand forces applied thereto.

The portion 4a of the shaft 4 with an increased diameter is positioned adjacent the screw thread 8 of the body 4. This means that the portion 4b of the shaft 4 with a narrow diameter is positioned in the part of the connector 1 furthest from the point at which the connector is attached to a seat, i.e. away from the head 2 of the connector. This is advantageous because it means that the part of the connector 1 most likely to bend during an emergency, i.e. the portion 4b with a narrow diameter, is positioned away from the point at which the connector 1 is attached to the seat 25. This means that the integrity of the connection to an aircraft seat 25 can be maintained during bending of the portion 4b with a narrow diameter.

Figure 6:
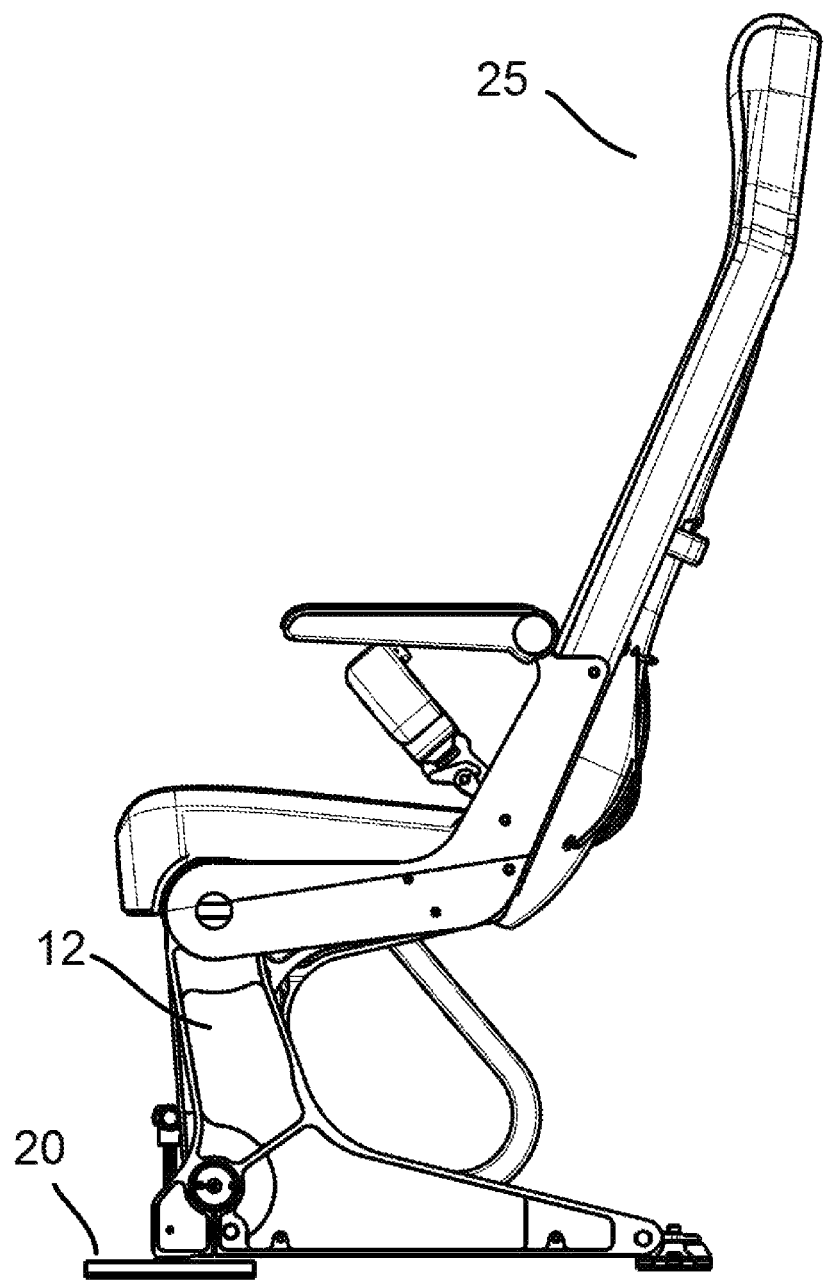
FIG. 6 shows a side view of a row of aircraft seats secured to the floor of an aircraft cabin via connectors as shown in FIG. 1.

With reference to FIGS. 6 and 7, there is shown a row of three aircraft seats 25 secured to a track 20 provided on the floor of an aircraft cabin (not shown) by a connector attached to the front of each leg 12. In order to allow access to the hex socket 13 of the connector, part of the front edge of each leg 12 is curved inwards (concave) towards the rear of each leg 12. In addition, the position at which each connector is secured to the seat 25 is set back from the front edge of the seat 25 to maximise legroom in front of the seat 25.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications are covered by the appended claims.

The invention claimed is:

1. A connector for securing an aircraft seat to a floor of an aircraft cabin, the connector comprising:
   a head for securing the connector to the aircraft seat and a foot for being held within a securing device on the floor of the aircraft cabin, said head and foot being provided on a body; and
   a stop for restricting rotational movement of the body relative to the aircraft seat,
   wherein the head comprises a first screw thread for engagement with a screw thread of the aircraft seat and a second screw thread in engagement with a screw thread on the body, wherein the first and the second screw threads are configured such that rotation of the head into engagement with a screw thread of the aircraft seat causes movement of the body into engagement with the head, and wherein the stop is configured for restricting rotational movement of the body about its longitudinal axis and for allowing movement of the body along its longitudinal axis.

2. A connector according to claim 1, wherein movement of the foot relative to the aircraft seat causes the aircraft seat to tighten into engagement with the securing device on the floor of the aircraft cabin.

3. A connector according to claim 1, wherein the head further comprises a collar for positioning around the body.

4. A connector according to claim 1, wherein the first screw thread is provided on an outside surface of the head and the second screw thread is provided on an inside surface of the head.

5. A connector according to claim 1, wherein the screw thread on the body is provided on an outside surface of the body.

6. A connector according to claim 1, wherein the first screw thread of the head is provided in a first direction and the screw thread on the body is provided in a second direction.

7. A connector according to claim 1, wherein the first screw thread of the head comprises a density of threads different to that of the screw thread on the body.

8. A connector according to claim 1, wherein the head is configured for engaging a tool for turning the head in a clockwise or anticlockwise direction.

9. A connector according to claim 1, wherein the stop comprises a slot.

10. A connector according to claim 1, wherein the stop is adapted to receiving a pin inserted through a leg of the aircraft seat.

11. A connector according to claim 1, wherein the body comprises an elongate shaft.

12. A connector according to claim 1, wherein the body comprises a portion of increased diameter for accommodating the stop.

13. A connector according to claim 12, wherein the portion of increased diameter is positioned adjacent the screw thread of the body.

14. A connector according to claim 1, further comprising a washer between the foot and the head.

15. A connector according to claim 14, wherein the washer is domed.

16. A seat or row of seats comprising one or more connectors for securing the seat or row of seats to a floor of an aircraft cabin, the one or more connectors comprising:
   a head for securing the connectors to the seat or the row of seats and a foot for being held within a securing device on the floor of the aircraft cabin, said head and foot being provided on a body, wherein the head comprises a first screw thread for engagement with a screw thread of the seat or the row of seats and a second screw thread in engagement with a screw thread on the body; and
   a stop for restricting rotational movement of the body relative to the seat or the row of seats, wherein the screw threads are configured such that rotation of the head into engagement with a screw thread of the seat or the row of seats causes movement of the body into engagement with the head and wherein the stop is configured for restricting rotational movement of the body about its longitudinal axis and for allowing movement of the body along its longitudinal axis.

* * * * *